United States Patent
Biggs et al.

(10) Patent No.: US 10,691,207 B2
(45) Date of Patent: Jun. 23, 2020

(54) DISPLAY DEVICES WITH VIRTUAL REPRSENTATIONS OF ELECTRONIC DEVICES

(71) Applicant: Hewlett-Packard Development Company, L.P., Houston, TX (US)

(72) Inventors: Kent E. Biggs, Houston, TX (US); Robert Paul Martin, Ft. Collins, CO (US); Charles J Stancil, Houston, TX (US); Jeffrey C Stevens, Houston, TX (US); Harold Merkel, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 64 days.

(21) Appl. No.: 15/759,098

(22) PCT Filed: Sep. 22, 2015

(86) PCT No.: PCT/US2015/051335
§ 371 (c)(1),
(2) Date: Mar. 9, 2018

(87) PCT Pub. No.: WO2017/052502
PCT Pub. Date: Mar. 30, 2017

(65) Prior Publication Data
US 2018/0284889 A1    Oct. 4, 2018

(51) Int. Cl.
*G06F 3/01*  (2006.01)
*G09G 5/00*  (2006.01)
(Continued)

(52) U.S. Cl.
CPC ............ *G06F 3/016* (2013.01); *G06F 3/0489* (2013.01); *G06F 3/04886* (2013.01); *G09G 5/00* (2013.01);
(Continued)

(58) Field of Classification Search
CPC ... G06F 3/016; G06F 3/04892; G06F 3/04886
See application file for complete search history.

(56) References Cited

U.S. PATENT DOCUMENTS 8,466,873 B2    6/2013   Vertegaal et al.
8,736,547 B2    5/2014   Chang et al.
(Continued)

FOREIGN PATENT DOCUMENTS

CN    104167829 A    11/2014
EP      2474890 A1    7/2010
(Continued)

OTHER PUBLICATIONS

Purcher, Jack, "Apple Invents Mind Boggling Next Generation Smart Cover with Multi-touch Flexible Display, Solar Panels & Built-in Keyboard", Patently Apple, Aug. 2, 2012. 16 pages.
(Continued)

*Primary Examiner* — Seth A Silverman
(74) *Attorney, Agent, or Firm* — HP Inc. Patent Department

(57) ABSTRACT

An example display device includes an input module to receive a touch input that identifies a shape of an electronic device. The display device also includes a display panel. The display panel is to display first data from a computing device in a first region of the display panel. The display panel is also to, in response to a reception of the touch input, display the first data in a second region of the display panel and display second data from the electronic device in a virtual representation of the electronic device in a third region of the display panel. The third region corresponds to the shape of the electronic device. The second data is received via a connection to the computing device. The second region is smaller than the first region.

13 Claims, 9 Drawing Sheets

(51) Int. Cl.
  *G06F 3/0488* (2013.01)
  *G06F 3/0489* (2013.01)
  *G06F 3/14* (2006.01)
(52) U.S. Cl.
  CPC ... *G06F 3/1454* (2013.01); *G09G 2320/0626* (2013.01); *G09G 2330/02* (2013.01); *G09G 2330/021* (2013.01); *G09G 2340/04* (2013.01); *G09G 2340/14* (2013.01); *G09G 2370/20* (2013.01)

(56) References Cited

U.S. PATENT DOCUMENTS

| | | | | |
|---|---|---|---|---|
| 2007/0091180 | A1* | 4/2007 | Han | G06F 3/04842 |
| | | | | 348/207.99 |
| 2010/0108409 | A1* | 5/2010 | Tanaka | G06F 3/044 |
| | | | | 178/18.06 |
| 2012/0185790 | A1* | 7/2012 | Bae | G06F 3/0488 |
| | | | | 715/769 |
| 2013/0024189 | A1* | 1/2013 | Kim | G10L 13/04 |
| | | | | 704/201 |
| 2013/0260677 | A1* | 10/2013 | Partovi | H01F 5/003 |
| | | | | 455/41.1 |
| 2014/0009394 | A1* | 1/2014 | Lee | H04N 5/4403 |
| | | | | 345/157 |
| 2014/0053090 | A1* | 2/2014 | Lu | G06F 3/017 |
| | | | | 715/761 |
| 2014/0210799 | A1 | 7/2014 | Kalaldeh et al. | |
| 2014/0218298 | A1* | 8/2014 | Law | G06F 3/0216 |
| | | | | 345/168 |
| 2015/0062045 | A1 | 3/2015 | White et al. | |
| 2016/0098107 | A1 | 4/2016 | Morrell et al. | |

FOREIGN PATENT DOCUMENTS

| | | |
|---|---|---|
| KR | 1020110103368 A | 9/2011 |
| TW | 200612305 A | 4/2006 |
| TW | 201216076 A | 4/2012 |

OTHER PUBLICATIONS

Unknown, "EXODesk's Interactive Desktop Video", Techno Fuse, Nov. 21, 2011, 5 pages.
Unknown, "Next-generation User Interface for Intuitive Touch-based Operations by Fujitsu", Tuvie , Apr. 223, 20137 pages.
Unknown, "SwitchBlade User Interface", Razer Inc., 2015, 6 pages.

* cited by examiner

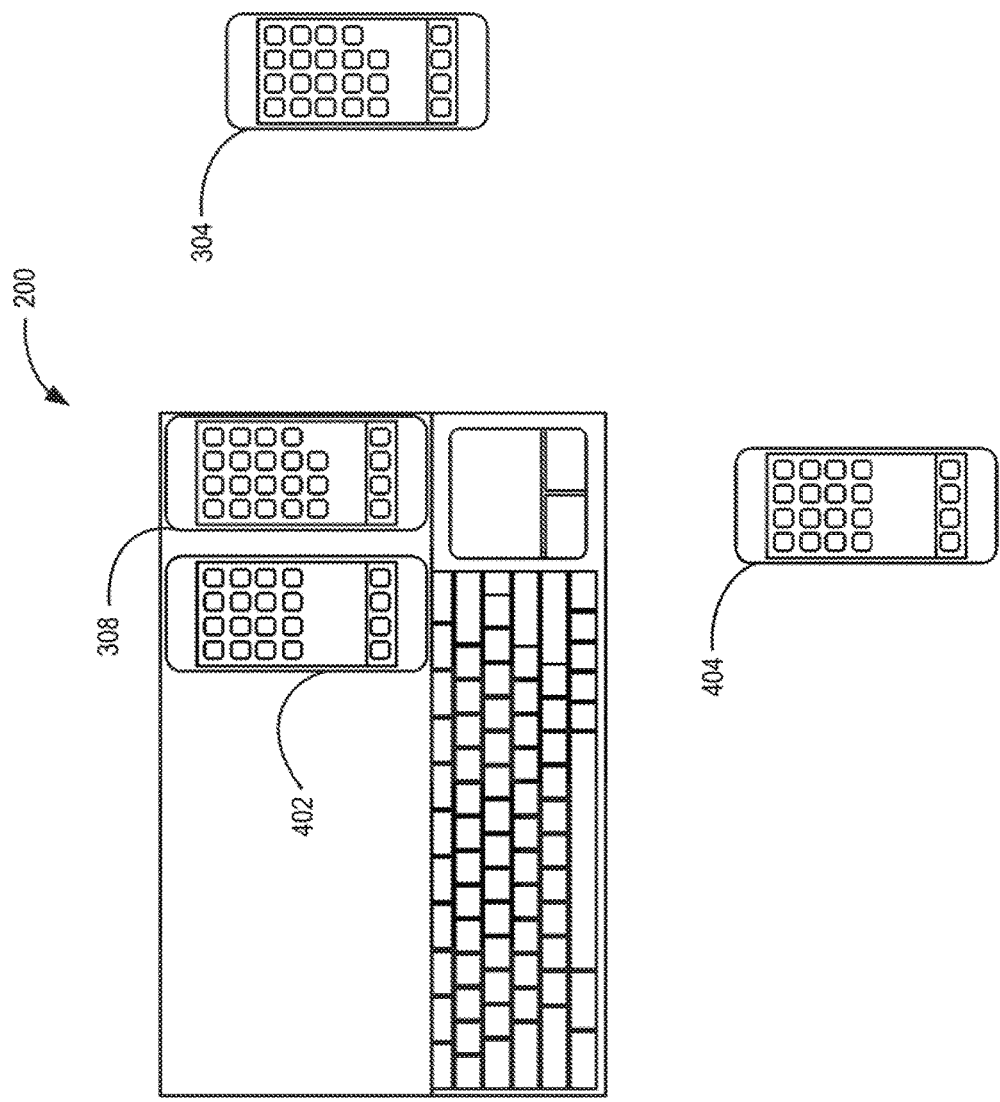

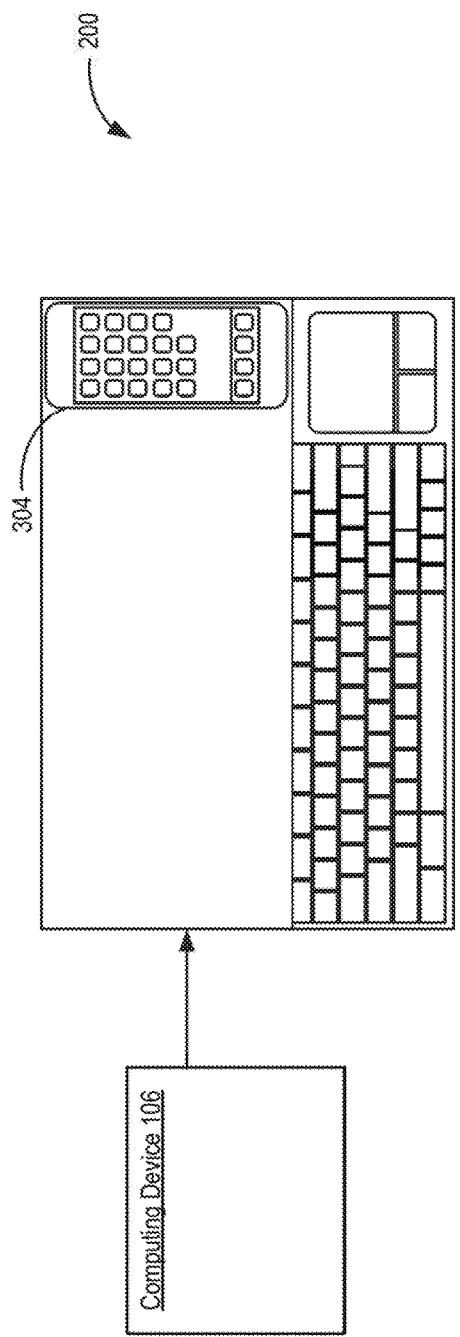
FIG. 5A
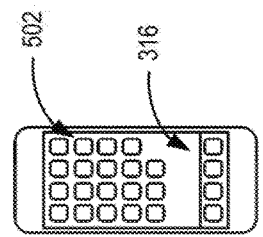
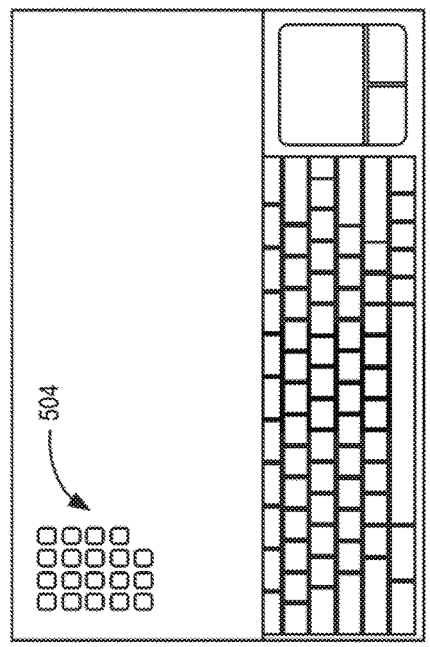
FIG. 5B

DISPLAY DEVICES WITH VIRTUAL REPRSENTATIONS OF ELECTRONIC DEVICES

BACKGROUND

A computing device, such as a desktop computer, is connected to a plurality of accessories so that a user may interact with the computing device. For example, the plurality of accessories may include a display device, a keyboard, and a mouse. In an environment where desktop space is limited, working with a plurality of accessories to interact with a computing device may pose challenges.

BRIEF DESCRIPTION OF THE DRAWINGS

Some examples of the present application are described with respect to the following figures:

FIG. 4 is illustrates a method of operation at a display device to display virtual representations of a plurality of electronic devices, according to an example;

FIGS. 5A-5B illustrate a method of operation at a display device to display data from an electronic device, according to an example;

DETAILED DESCRIPTION

As described above, working with a plurality of accessories to interact with a computing device may pose challenges in an environment where desktop space is limited, such as in an office or cubicle environment. For example, the desktop space may be cluttered. As another example, the accessories may not provide an ergonomic interaction with the computing device. Thus, productivity may be reduced.

Examples described herein provide a display device with a plurality of components to provide a synergistic user interface and experience. For example, a display device may include an input module to receive a touch input that identifies a shape of an electronic device. The display device may also include a display panel. The display panel may display first data from a computing device in a first region of the display panel. The display panel, in response to a reception of the touch input, may display the first data in a second region of the display panel, where the second region is smaller than the first region. The display panel, in response to a reception of the touch input, may display second data from the electronic device in a virtual representation of the electronic device in a third region of the display panel, where the third region corresponds to the shape of the electronic device, and where the second data is received via a connection to the computing device. In this manner, examples described herein may reduce desktop space cluttering and increase productivity.

Figure 1:
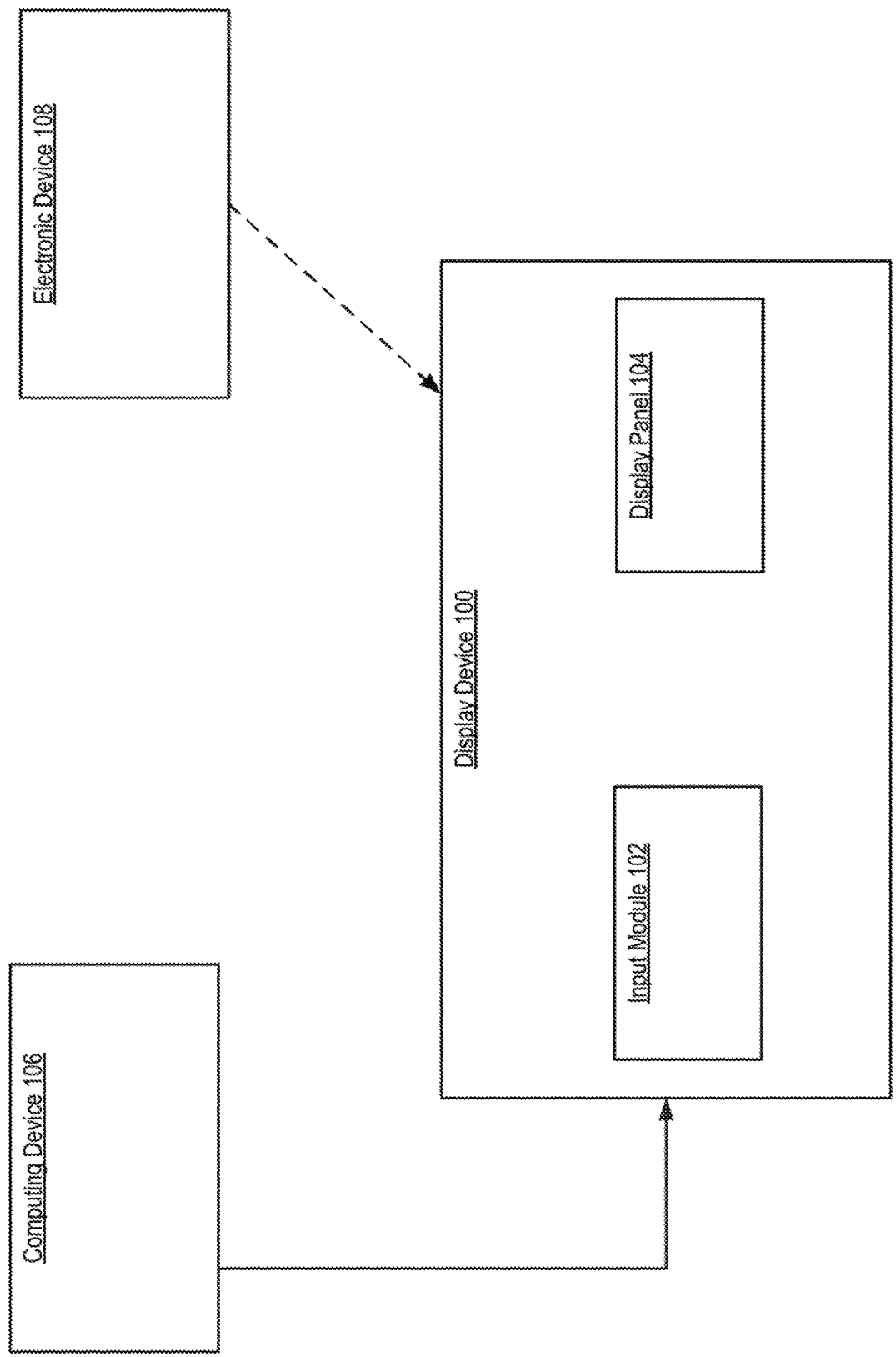
FIG. 1 is a block diagram of a display device to display a virtual representation of an electronic device, according to an example.

Referring now to the figures, FIG. 1 is a block diagram of a display device 100 to display a virtual representation of an electronic device, according to an example. Display device 100 may include an input module 102 and a display panel 104. Input module 102 may be a circuit or device that detects/senses an input from a user via physical contact from a finger of the user or a stylus/pen. For example, input module 102 may be a circuit or device that detects/senses a touch input via capacitive sensing, such as projected capacitance sensing. It should be understood that other types of sensing technology may also be used, such as resistive sensing. Display panel 104 may be a device to visually present data. For example, display panel 104 may be an organic light-emitting diode (OLED) display panel. It should be understood that display panel 104 may be other types display panels, such as a light-emitting diode (LED) display panel.

During operation, display device 100 may be connected to a computing device 106 so that data from computing device 106 may be displayed on display device 100 via display panel 104. Display device 100 may be connected to computing device 106 via a universal serial bus (USB) Type C connection, a USB Type A connection, etc. A single connection may be used for data communication and power delivery between display device 100 and computing device 106. An electronic device 108, such as a mobile phone, may be placed on display device 100 to receive wireless charging. A user of display device 100 may provide a touch input that identifies a shape of electronic device 108 via input module 102. In response to a reception of the touch input, display device 100 may display a virtual representation of electronic device 108 in a region of display panel 104 that is covered by electronic device 108. Thus, the user may remove electronic device 108 from display device 100 and may interact with electronic device 108 via display device 100.

Figure 2:
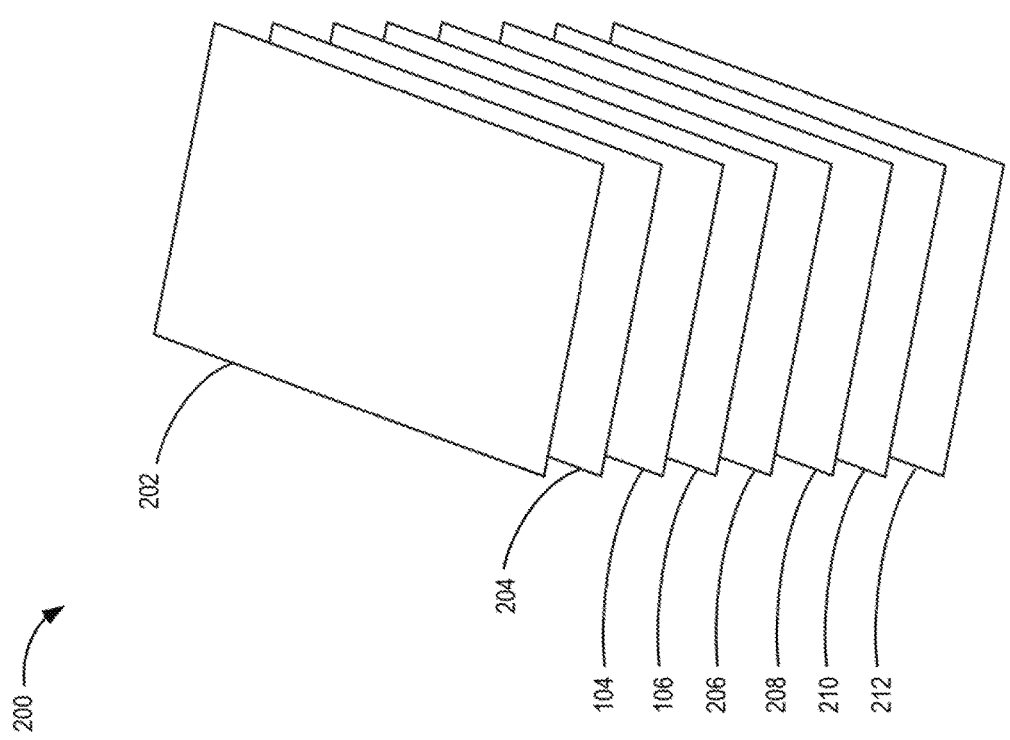
FIG. 2 is a block diagram of a display device to display a virtual representation of an electronic device, according to an example.

FIG. 2 is a block diagram of display device 200 to display a virtual representation of an electronic device, according to an example. Display device 200 may implement display device 100 of FIG. 1. Display device 200 may include a top cover 202. Top cover 202 may be antiglare and/or antimicrobial. Display device 200 may also include a digital film layer 204. Digital film layer 204 may be used with a digital pen. In an example, digital film layer 204 may be encoded with coordinate information that a digital pen may be used to determine the movements of the digital pen. Hence, writings or drawings done by the digital pen may be captured.

Display device 200 may further include input module 102 and display panel 104. Display device 200 may further include a substrate layer 206, a haptic module 208, a charging module 210, and a bottom cover 212. Haptic module 208 may provide tactile feedback in response to a particular touch input sensed by input module 102. Charging module 210 may transfer electrical power to an electronic device wirelessly, such as electronic device 108 of FIG. 1. Bottom cover 212 may be made from flexible material, such as rubber. Bottom cover 212 and top cover 202 may encompass other layers and modules of display device 200 to form an enclosed device.

Figure 3A:
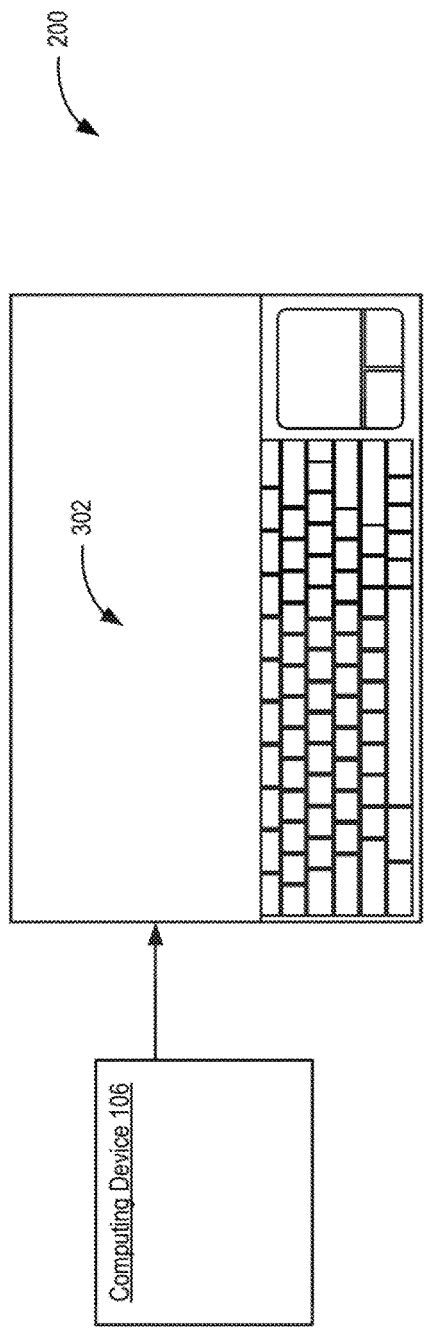
FIGS. 3A-3C illustrate a method of operation at a display device to display a virtual representation of an electronic device, according to an example.
Figure 3B:
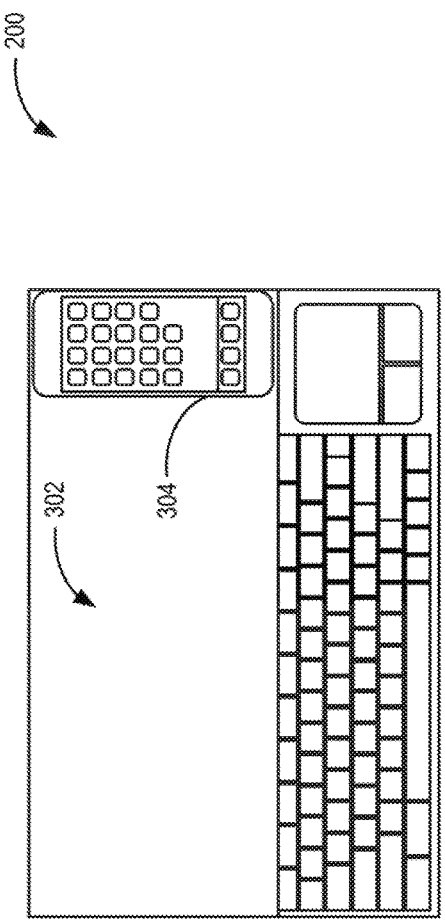
Figure 3C:
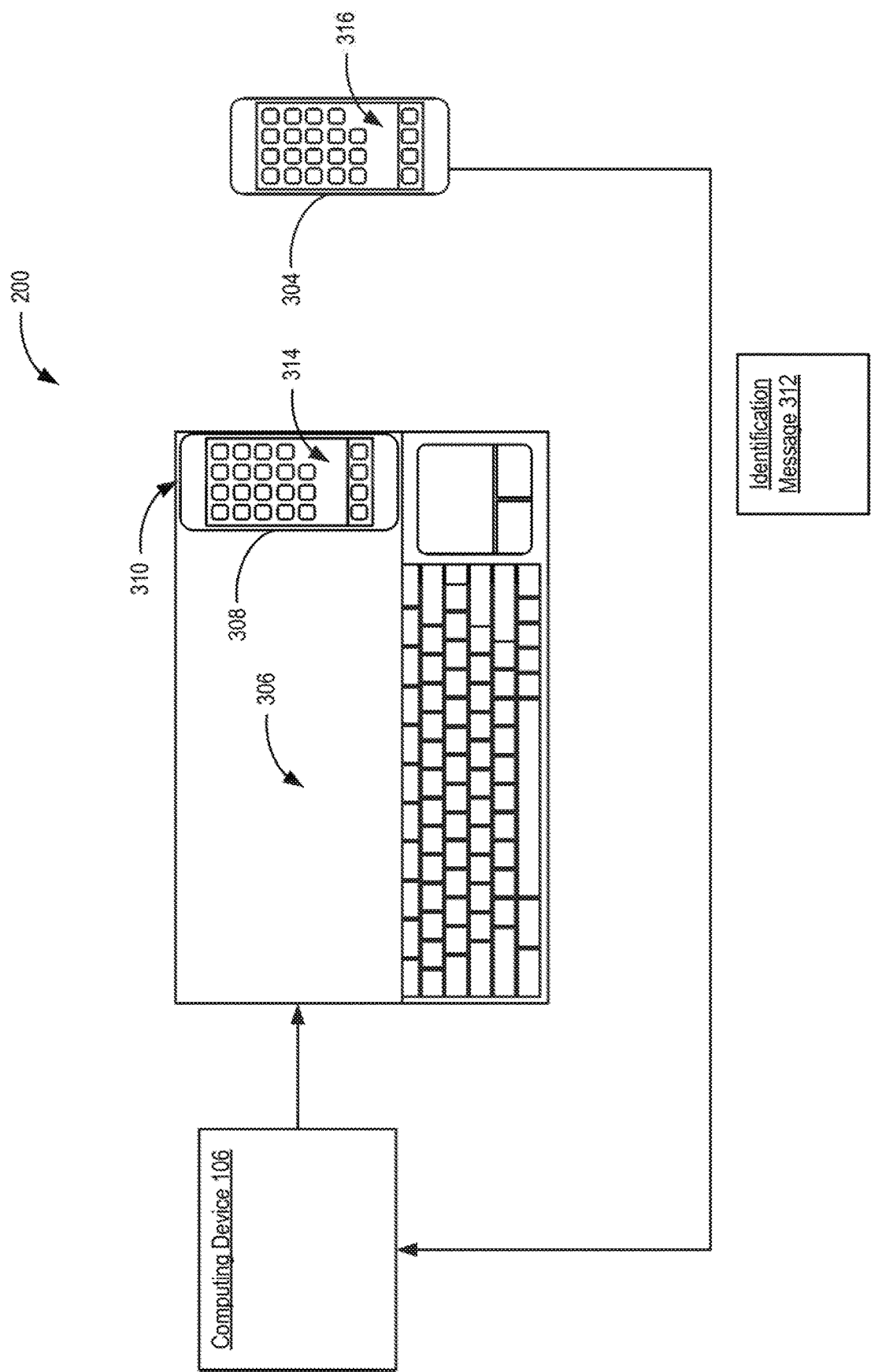

FIGS. 3A-3C illustrate a method of operation at display device 200 to display a virtual representation of an electronic device, according to an example.

Referring now to FIG. 3A, during operation, display device 200 may be connected to computing device 106. Display device 200 may display data from computing device 106 on a first region 302 of display panel 104 (not shown in FIGS. 3A-3C).

Referring now to FIG. 3B, an electronic device 304, such as a mobile phone, may be placed on display device 200 to receive wireless charging from display device 200. Thus, electronic device 304 may cover up a portion of first region 302. A user of display device 200 may manually trace the outline of electronic device 304 on display device 200 using a finger or a stylus. Display device 200 may sense the trace as a touch input that identifies the shape of electronic device 304. Thus, the shape of electronic device 304 and the portion of first region 302 being covered up may be identified.

Referring now to FIG. 3C, in response to the touch input that identifies the shape of electronic device 304, computing device 106 may direct display device 200 to display the data from computing device 106 in a second region 306 of the display panel of display device 200. Second region 306 may correspond to a first portion of first region 302 (e.g., the portion of first region 302 not covered up by electronic device 304). Second region 306 may be smaller than first region 302. Computing device 106 may also direct display device 200 to display a virtual representation 308 of electronic device 304 in a third region 310 of the display panel of display device 200. Third region 310 may correspond to a second portion of first region 302 (e.g., the portion of first region 302 covered up by electronic device 304). Third region 310 may be smaller than first region 302.

Computing device 106 may generate and direct display device 200 to display virtual representation 308 based on an identification message 312. For example, computing device 106 may detect a wireless charging operation to electronic device 304 via charging module 210 (Not shown in FIG. 3C). In response to the detection, computing device 106 may establish a wireless connection to electronic device 304. The wireless connection may be a Bluetooth connection, a Wi-Fi connection, etc. Electronic device 304 may transmit identification message 312 to computing device 106. Identification message 312 may include model information of electronic device 304, operation system information of electronic device 304, applications (implemented as processor executable instructions) installed in electronic device 304, graphical user interface information of electronic device 304, etc.

Virtual representation 308 may be displayed as a digital image of electronic device 304. Virtual representation 308 may include a virtual graphical user interface (GUI) 314 that corresponds to a GUI 316 of electronic device 304. Thus, data from electronic device 304 may be displayed on virtual representation 308 via virtual GUI 314. In response to a change to a GUI of electronic device 304, computing device 106 may direct display device 200 to update virtual GUI 314 to indicate the change so that the GUI of electronic device 304 and virtual GUI 314 may be synchronized. For example, when electronic device 304 receives a text message and a notification is displayed on GUI 316. Electronic device 304 may send changes to GUI 316 to computing device 106. Based on the changes, computing device 106 may direct display device 200 to display corresponding changes to virtual GUI 314. As another example, after the virtual representation 308 is generated and displayed on display device 200, the user may provide a touch input to virtual GUI 314 to control electronic device 304. Thus, when virtual representation 308 is generated, the user may remove electronic device 304 from display device 200 and interact with electronic device 304 via virtual representation 308.

In some examples, computing device 106 may control the brightness of display panel 104 based on a detection of whether electronic device 304 is in physical contact with display device 200. For example, in response to a detection by computing device 106 that a wireless charging operation to electronic device 304 has stopped, computing device 106 may reduce a brightness level of display panel 104. The wireless charging operation may be stopped when electronic device 304 is removed from display device 200. The stopping of the wireless charging operation may indicate that the user may be interacting with electronic device 304. Thus, computing device 106 may dim display panel 104 to reduce power consumption of display device 200.

FIG. 4 illustrates a method of operation at display device 200 to display virtual representations of a plurality of electronic devices, according to an example. As illustrated in FIG. 4, virtual representation 308 of electronic device 304 may be displayed on display device 200. A virtual representation 402 of an electronic device 404 may also be displayed on display device 200. Virtual representation 308 and virtual representation 402 may be displayed on different regions of display panel 104. Thus, a user may interact with multiple electronic devices simultaneously via display device 200.

FIGS. 5A-5B illustrate a method of operation at display device 200 to display data from an electronic device, according to an example. Referring now to FIG. 5A, electronic device 304 may be placed on display device 200 to receive wireless charging. In response to a detection of the wireless charging operation, computing device 106 may establish a wireless connection with electronic device 304 as described in FIG. 3C. In some examples, computing device 106 may establish the wireless connection with electronic device 304 in response to a reception of a touch input that identifies the shape of electronic device 304 as described in FIG. 3B.

Referring now to FIG. 5B, in response to establishing the wireless connection, display device 200 may display data from electronic device 304. Instead of displaying a virtual representation of electronic device 304, display device 200 may serve as an extended GUI of electronic device 304. For example, a first set of icons 502 may be displayed on GUI 316 of electronic device 304. A second set of icons 504 from electronic device 304 may be displayed on display device 200 via display panel 104.

Figure 6A:
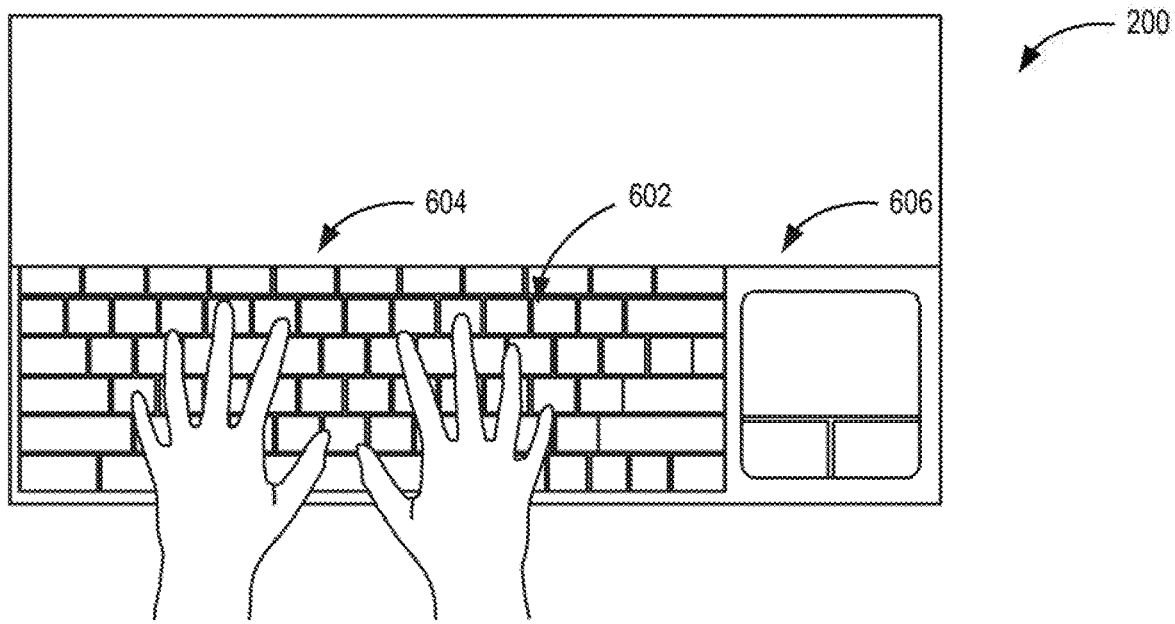
FIG. 6A illustrates a method of operation at a display device to display an input device based on an analysis of finger placements of a user, according to an example.

FIG. 6A illustrates a method of operation at display device 200 to display an input device based on an analysis of finger placements of a user, according to an example. Referring to FIG. 6A, when a user places both hands on display device 200, input module 102 (not shown in FIGS. 6A-6B) of display device 200 may sense the locations of the fingertips relative to display panel 104. Based on the locations, computing device 106 (not shown in FIGS. 6A-6B), connected to display device 200, analyze the distances between particular fingers (e.g., the distance between the two little fingers). Based on the analysis, computing device 106 may direct display device to display a first type of virtual keyboard 602 in a fourth region 604 of display panel 104. Virtual keyboard 602 may have a first type of keyboard layout (e.g., non-ergonomic keyboard layout). Display device 200 may also display a second virtual input device, such as a virtual trackpad 606 along with virtual keyboard 602. In some examples, the second input device may provide haptic feedback. In some examples, the type of virtual input device (e.g., virtual keyboard 602 and/or virtual trackpad 606) may be generated and displayed based on a user profile. For example, the user profile may indicate that the user is an adult, thus, a virtual keyboard having a first length may be generated and displayed. As another example, the user profile may indicate that the user is a child, thus, a virtual keyboard having a second length may be generated and displayed. The second length may be less than the first length.

Figure 6B:
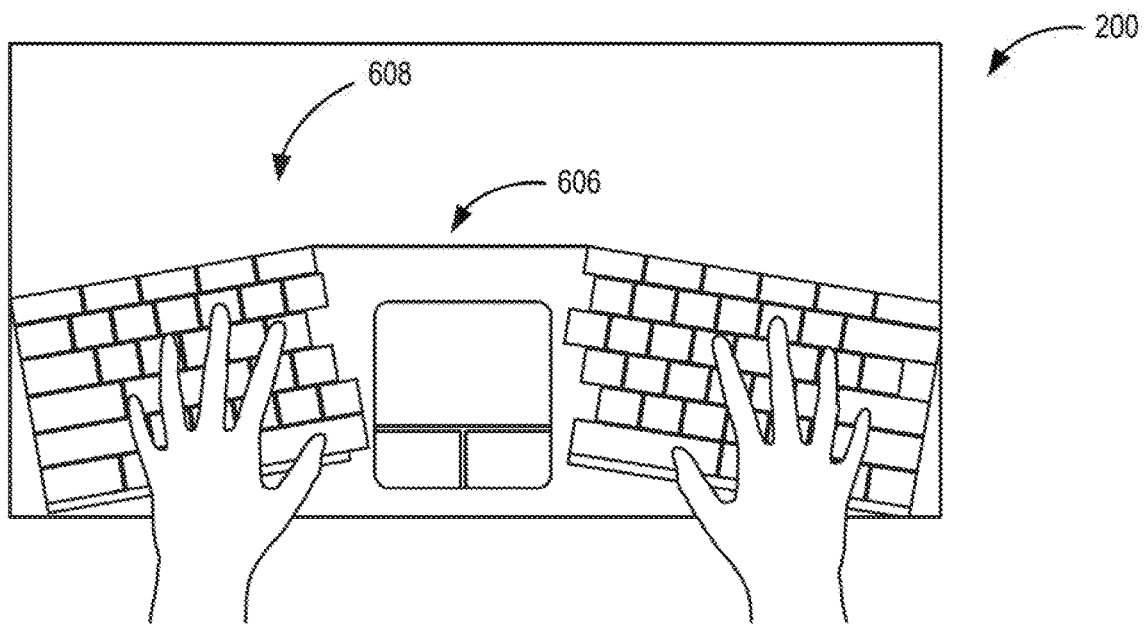
FIG. 6B illustrates a method of operation at a display device to display an input device based on an analysis of finger placements of a user, according to another example.

FIG. 6B illustrates a method of operation at display device 200 to display an input device based on an analysis of finger placements of a user, according to another example. Referring to FIG. 6B, a second user may have different finger placements than the user described in FIG. 6A (e.g., the distance between the two little fingers may be different). Based on the analysis of the finger placements of the user, computing device 106 may direct device 200 to display a second type of virtual keyboard 608 based on an analysis of the finger placements of a user. Virtual keyboard 608 may have a second type of keyboard layout (e.g., ergonomic keyboard layout) that is different from the first type of keyboard. Virtual trackpad 606 may be displayed between two halves of virtual keyboard 608.

Figure 7:
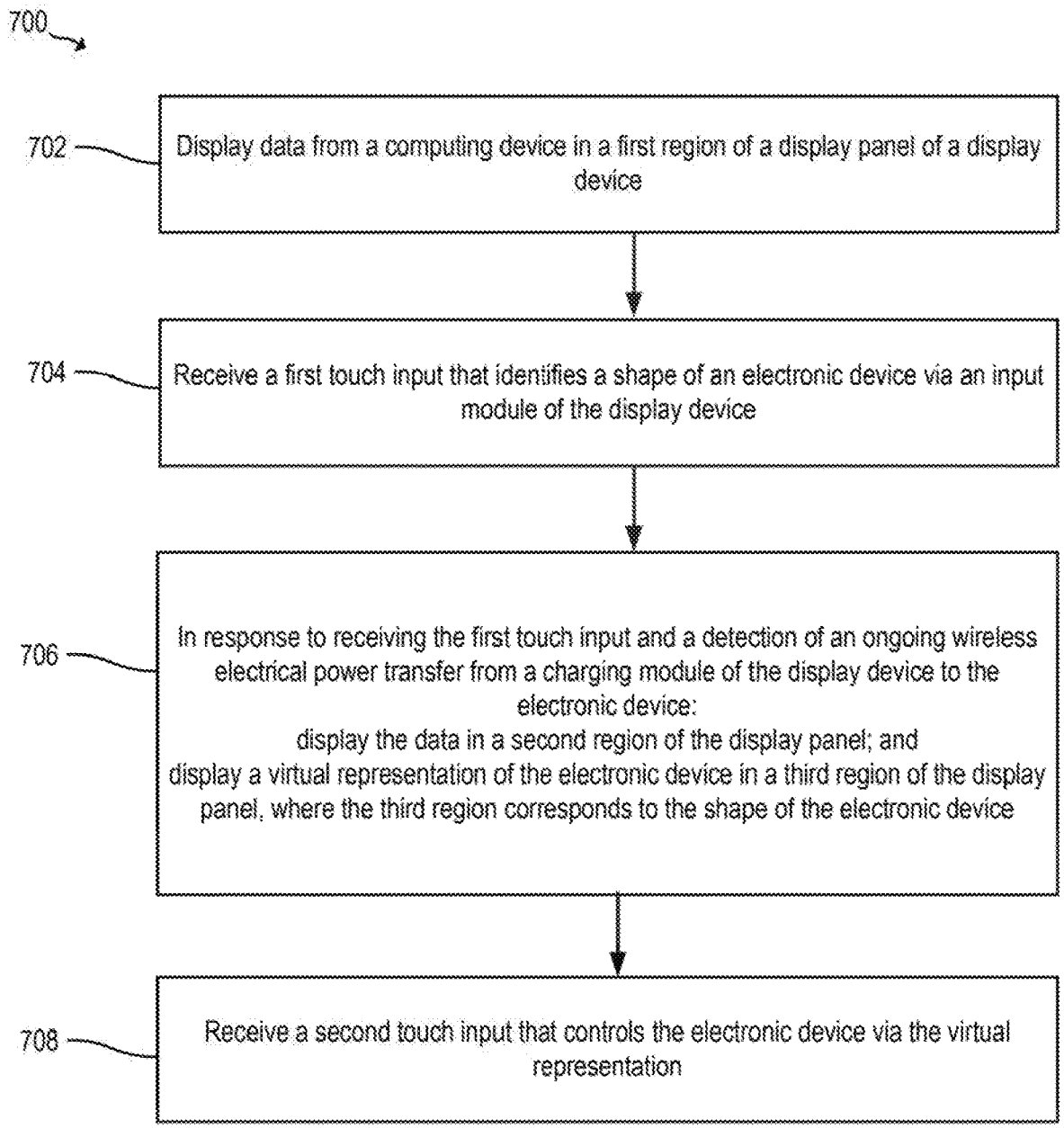
FIG. 7 is a flowchart illustrating a method of operation at a display device to display a virtual representation of an electronic device, according to an example.

FIG. 7 is a flowchart illustrating a method 700 of operation at a display device to display a virtual representation of an electronic device, according to an example. Method 700 may be implemented using display device 100 of FIG. 1 and/or display device 200 of FIGS. 2, 3A-3C, 4, 5A-5B, and 6A-6B. Method 700 includes displaying data from a computing device in a first region of a display panel of a display device, at 702. For example, referring to FIG. 3A, display device 200 may display data from computing device 106 on a first region 302 of display panel 104.

Method 700 also includes receiving a first touch input that identifies a shape of an electronic device via an input module of the display device, at 704. For example, referring to FIG. 3B, a user of display device 200 may manually trace the outline of electronic device 304 on display device 200 using a finger or a stylus. Display device 200 may sense the trace as a touch input that identifies the shape of electronic device 304.

Method 700 further includes in response to receiving the first touch input and a detection of an ongoing wireless electrical power transfer from a charging module of the display device to the electronic device, displaying the data in a second region of the display panel and displaying a virtual representation of the electronic device in a third region of the display panel, where the third region corresponds to the shape of the electronic device, at 706. For example, referring to FIG. 3C, in response to the touch input that identifies the shape of electronic device 304, computing device 106 may direct display device 200 to display the data from computing device 106 in second region 306 of the display panel of display device 200. Computing device 106 may also direct display device 200 to display virtual representation 308 of electronic device 304 in third region 310 of the display panel of display device 200.

Method 700 further includes receiving a second touch input that controls the electronic device via the virtual representation, at 708. For example, referring to FIG. 3C, after the virtual representation 308 is generated and displayed on display device 200, the user may provide a touch input to virtual GUI 314 to control electronic device 304.

Figure 8:
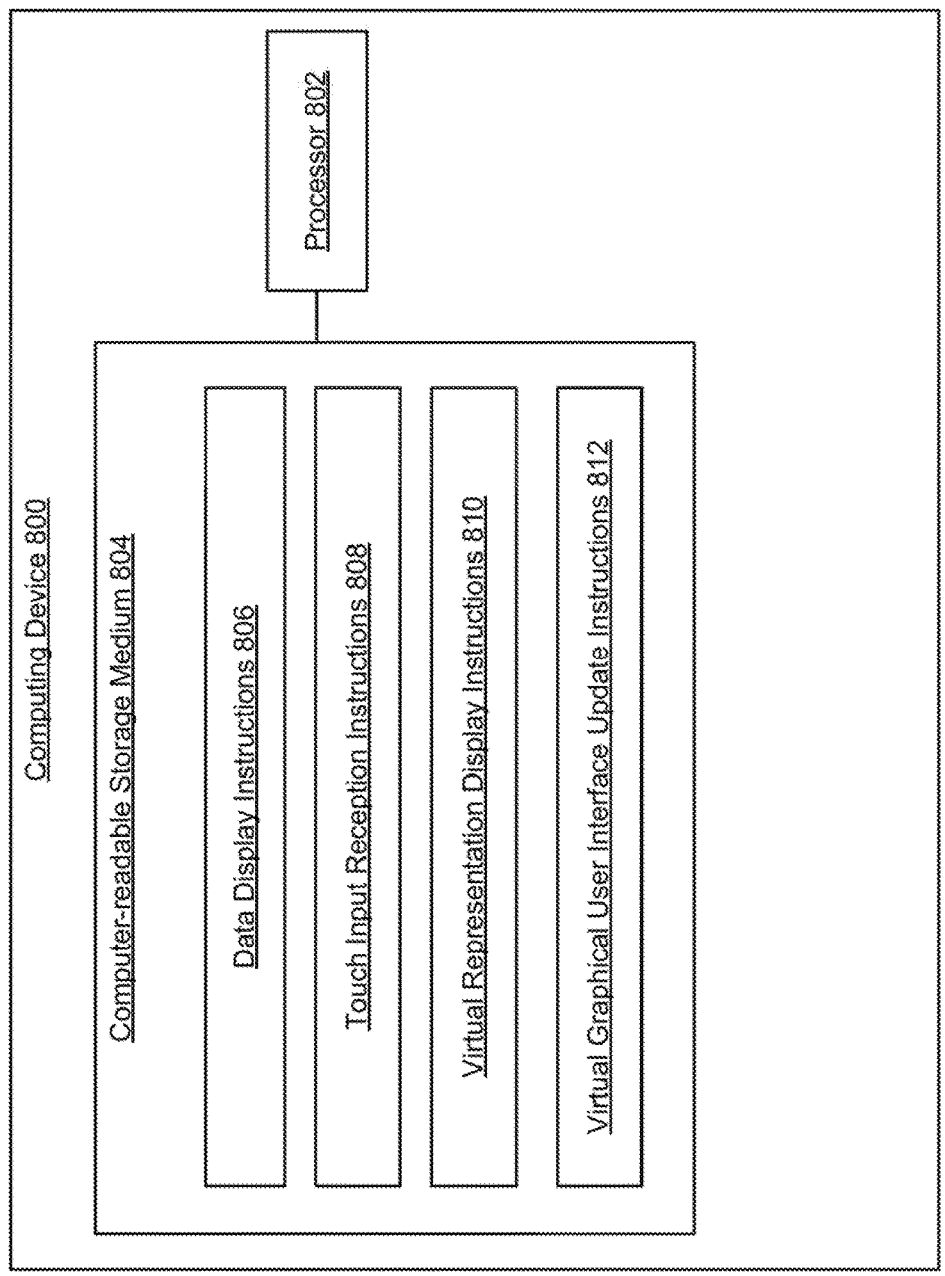
FIG. 8 is a block diagram of a computing device to direct a display device to display a virtual representation of an electronic device, according to an example.

FIG. 8 is a block diagram of a computing device 800 to direct a display device to display a virtual representation of an electronic device, according to an example. Computing device 800 may implement computing device 106 of FIGS. 1 and 3A. Computing device 800, for example, may be a web-based server, a local area network server, a cloud-based server, a notebook computer, a desktop computer, an all-in-one system, a tablet computing device, a mobile phone, an electronic book reader, or any other electronic device suitable for controlling a display device, such as display device 100 and/or display device 200. Computing device 800 may include a processor 802 and a computer-readable storage medium 804.

Processor 802 may be a central processing unit (CPU), a semiconductor-based microprocessor, and/or other hardware devices suitable for retrieval and execution of instructions stored in computer-readable storage medium 804. Processor 802 may fetch, decode, and execute instructions 806, 808, 810, and 812 to control a display device. As an alternative or in addition to retrieving and executing instructions, processor 802 may include at least one electronic circuit that includes electronic components for performing the functionality of instructions 806, 808, 810, 812, or a combination thereof.

Computer-readable storage medium 804 may be any electronic, magnetic, optical, or other physical storage device that contains or stores executable instructions. Thus, computer-readable storage medium 804 may be, for example, Random Access Memory (RAM), an Electrically Erasable Programmable Read-Only Memory (EEPROM), a storage device, an optical disc, etc. In some examples, computer-readable storage medium 804 may be a non-transitory storage medium, where the term "non-transitory" does not encompass transitory propagating signals. As described in detail below, computer-readable storage medium 804 may be encoded with a series of processor executable instructions 806-812.

Data display instructions 806 may direct a display device coupled to the computing device to display data from the computing device in a first region of a display panel of the display device. For example, referring to FIG. 3A, display device 200 may display data from computing device 106 on first region 302.

Touch input reception instructions 808 may receive a first touch input that identifies a shape of an electronic device via an input module of the display device. For example, referring to FIG. 3B, a user of display device 200 may manually trace the outline of electronic device 304 on display device 200 using a finger or a stylus. Display device 200 may sense the trace as a touch input that identifies the shape of electronic device 304.

Virtual representation display instructions 810 may display a virtual representation of an electronic device on a display. For example, referring to FIG. 3C, computing device 106 may also direct display device 200 to display virtual representation 308 of electronic device 304 in third region 310 of the display panel of display device 200.

Virtual graphical user interface update instructions 812 may update a virtual graphical user interface of a virtual representation of an electronic device in response to a change to a graphical user interface of the electronic device. For example, referring to FIG. 3C, in response to a change to a GUI of electronic device 304, computing device 106 may direct display device 200 to update virtual GUI 314 to indicate the change so that the GUI of electronic device 304 and virtual GUI 314 may be synchronized.

The use of "comprising", "including" or "having" are synonymous and variations thereof herein are meant to be inclusive or open-ended and do not exclude additional unrecited elements or method steps.

What is claimed is:

1. A display device comprising:
    an input module to receive a touch input that identifies a shape of an electronic device, wherein the touch input includes a trace input of an outline of the electronic device positioned in physical contact with a display panel at the first region; and
    the display panel to:
        display first data from a computing device in a first region of the display panel;
        provide wireless charging to the electronic device while the electronic device is in physical contact with the display panel;
        reduce a brightness level of the display panel when the wireless charging of the electronic device is stopped; and
        in response to a reception of the touch input:
            display the first data in a second region of the display panel, wherein the second region is smaller than the first region; and
            display second data from the electronic device in a virtual representation of the electronic device in a third region of the display panel, wherein the third region corresponds to the shape of the electronic device, and wherein the second data is received via a connection to the computing device.

2. The display device of claim 1, further comprising a charging module to transfer electrical power to the electronic device wirelessly.

3. The display device of claim 1, further comprising a haptic module to provide tactile feedback in response to a particular touch input.

4. The display device of claim 1, wherein the display panel is further to display a virtual input device based on a user profile.

5. The display device of claim 1, further comprising a digital film layer to provide coordinate information to a digital pen.

6. A method comprising: displaying data from a computing device in a first region of a display panel of a display device; receiving a first touch input that identifies a shape of an electronic device via an input module of the display device, wherein the touch input includes a trace input of an outline of the electronic device positioned in physical contact with a display panel at the first region; in response to receiving the first touch input and a detection of an ongoing wireless electrical power transfer from a charging module of the display device to the electronic device: displaying the data in a second region of the display panel; and displaying a virtual representation of the electronic device in a third region of the display panel, wherein the third region corresponds to the shape of the electronic device; receiving a second touch input that controls the electronic device via the virtual representation; and reducing a brightness level of the display panel when the wireless charging of the electronic device is stopped.

7. The method of claim 6, further comprising displaying a virtual keyboard in a fourth region of the display panel, wherein a type of the virtual keyboard is determined based on an analysis of finger placements of a user of the computing device on the display device.

8. The method of claim 6, wherein the virtual representation is generated based on an identification message received from the electronic device.

9. The method of claim 6, wherein the second region is smaller than the first region.

10. A non-transitory computer-readable storage medium comprising instructions that when executed cause a processor of a computing device to:
    direct a display device coupled to the computing device to display data from the computing device in a first region of a display panel of the display device;
    receive a first touch input that identifies a shape of an electronic device via an input module of the display device, wherein the first touch input includes a trace input of an outline of the electronic device positioned at the first region;
    in response to a reception of the first touch input, direct the display device to:
    display the data in a second region of the display panel, wherein the second region is smaller than the first region; and
    display a virtual representation of the electronic device in a third region of the display panel, wherein the third region corresponds to the shape of the electronic device, and wherein the virtual representation includes a virtual graphical user interface that corresponds to a graphical user interface of the electronic device;
    direct the display device to update the virtual graphical user interface based on a change to the graphical user interface;
    provide wireless charging to the electronic device while the electronic device is in physical contact with the display panel; and
    reduce a brightness level of the display panel when the wireless charging of the electronic device is stopped.

11. The non-transitory computer-readable storage medium of claim 10, wherein the instructions when executed further cause the processor to:
    in response to a detection of a wireless charging operation to the electronic device, establish a wireless connection with the electronic device; and
    receive an identification message from the electronic device via the wireless connection, wherein the identification message contains information associated with a model of the electronic device.

12. The non-transitory computer-readable storage medium of claim 11, wherein the instructions when executed further cause the processor to generate the virtual representation based on the identification message.

13. The non-transitory computer-readable storage medium of claim 10, wherein the virtual graphical user interface and the graphical user interface are synchronized.

* * * * *